United States Patent [19]

Kimura

[11] Patent Number: 4,936,709
[45] Date of Patent: Jun. 26, 1990

[54] METHOD AND APPARATUS FOR LAYING PIPES IN THE GROUND WITH ADVANCE OF PROPULSION SHAFTS INSTALLED WITH PIPE-SUPPORTING ATTACHMENTS

[75] Inventor: Koichi Kimura, Kobe, Japan

[73] Assignee: Kidoh Technical Ins, Co., Ltd., Kobe, Japan

[21] Appl. No.: 348,920

[22] Filed: May 8, 1989

[30] Foreign Application Priority Data

Jun. 8, 1988 [JP] Japan .............................. 63-76208[U]
Aug. 3, 1988 [JP] Japan ........................... 63-103319[U]

[51] Int. Cl.$^5$ .......................... E21D 11/00; F16L 7/00
[52] U.S. Cl. ...................................... 405/184; 175/62; 405/142; 405/146
[58] Field of Search .................. 175/62; 405/142, 146, 405/154, 184

[56] References Cited

U.S. PATENT DOCUMENTS

| | | | |
|---|---|---|---|
| 3,402,781 | 9/1968 | Sandberg | 175/62 |
| 3,605,420 | 9/1971 | Booth et al. | 405/184 |
| 3,762,174 | 10/1973 | Fikse et al. | 405/184 |
| 4,024,721 | 5/1977 | Takada et al. | 175/62 X |
| 4,673,312 | 6/1987 | Nussbaumer | 405/184 |

FOREIGN PATENT DOCUMENTS

| | | |
|---|---|---|
| 3228684 | 2/1984 | Fed. Rep. of Germany . |
| 3513750 | 10/1986 | Fed. Rep. of Germany . |
| 59-45077 | 11/1984 | Japan . |
| 1238578 | 7/1971 | United Kingdom ................. 405/184 |

*Primary Examiner*—Dennis L. Taylor
*Assistant Examiner*—Arlen L. Olsen
*Attorney, Agent, or Firm*—Armstrong, Nikaido, Marmelstein, Kubovcik & Murray

[57] ABSTRACT

A method and apparatus for laying pipes of low bearing force like a polyvinyl chloride pipe and others in the ground with a propulsion pipe laying method, wherein an excavation device to excavate a tunnel to lay pipes therein is propelled into the ground by a propulsion force exerted on a propulsion shaft joined behind an excavation device while the pipes to be laid are run over the propulsion shaft and propulsion shaft bodies are joined one after another to propulsion shaft bodies and the pipes are joined one after another to pipes. The propulsion shaft bodies have a supporting device on the outer periphery thereof which rigidly supports the inside surface of pipes run over the propulsion shaft. With this supporting power, pipes to be laid are propelled into the tunnel in accordance with an advancement of the propulsion shaft.

10 Claims, 5 Drawing Sheets

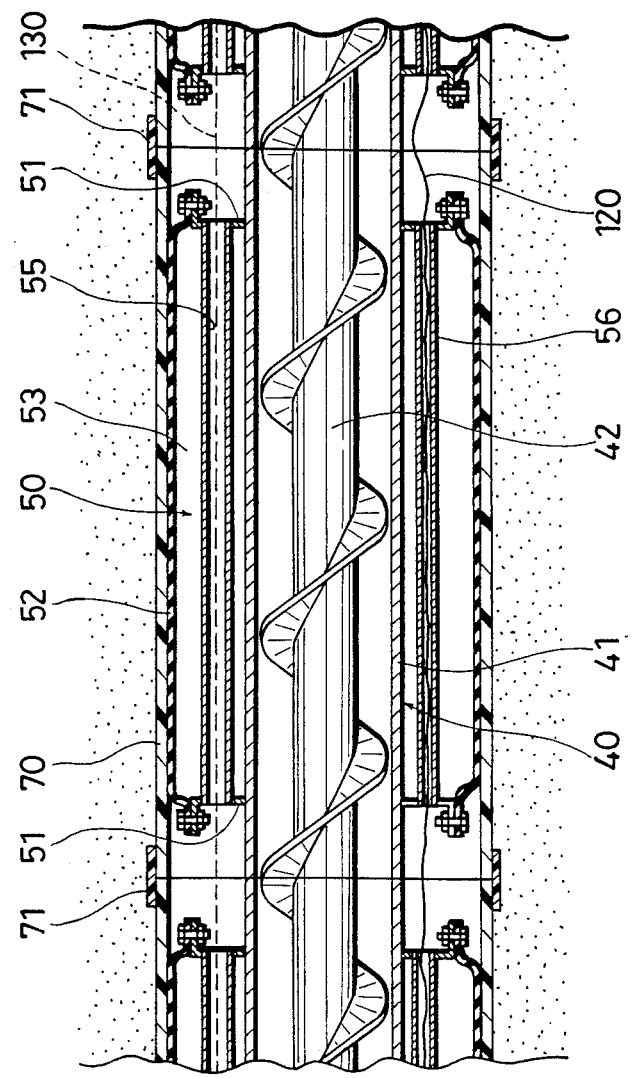

METHOD AND APPARATUS FOR LAYING PIPES IN THE GROUND WITH ADVANCE OF PROPULSION SHAFTS INSTALLED WITH PIPE-SUPPORTING ATTACHMENTS

BACKGROUND OF THE INVENTION

This invention relates to a method and an apparatus for propelling pipes to be laid in the ground in a propulsion pipe-laying method. It particularly relates to a method and an apparatus for laying pipes of comparatively small diameters made of polyvinyl chloride and the like and, thereby, of lower bearing force, than steel pipes, rather than those for laying such pipes as a gas pipe, a drainage pipe, and pipes for other uses.

There have been laid a number of pipes of many kinds such as a gas pipe, a water pipe, and a drainage pipe in the ground. Since steel pipes, concrete pipes, Hume pipes, and the like have high bearing force, they are used as pipes of a large diameter to be laid in main lines. On the other hand, such pipes as vinyl chloride pipes and the like are not suitable for use in main lines because of their low bearing force, but they are popularly used as pipes of a relatively small diameter in branch lines because of their small weight, ease in handling, an, cheap manufacture cost and, in addition, compared with a case of the main ine use, the pipes in branch lines are in greater amounts of demand and exchanged more frequently.

As a method to lay these kinds of pipes in the ground, the propulsion pipe-laying method is recently becoming popular. An example of this method is described in U.S. Pat. No. 4,024,721. In this method, a vertical pit is at first excavated from the ground surface and then, a pipe of standard length is put down in the pit to be inserted from the pit into the ground in a horizontal direction. The insertion is carried out by jointing the pipes one after another until the pipes reach a required length. This method does not need to excavate an open trench in a length equal to that of the series of pipes to be laid, so that the traffic on the ground surface is not seriously distributed.

In performing this method, the pipes are propelled by a jack, arranged in the vertical pit and pushing at the end of a trailing pipe in the pipe series. At the head of a leading pipe, excavation means (for example, an auger) is installed to excavate a tunnel for pipe-laying.

In this propulsion pipe-laying method, the pipes being jointed receive great repulsion force generating between the auger etc. and the ground in addtion to friction power between the pipes and the surrounding ground. Accordingly, this method has been so far only applied in the works in main lines where pipes of a large diameter are used.

However, if the propulsion pipe-laying method can be applied in the works in branch lines, it would be convent and beneficial to the public. Under these circumstances, the present inventor previously invented a method disclosed in the Japanese Patent Gazette (Kokoku) No. 59-45077.

In this new method, an auger etc. being installed on the head of a propulsion shaft of the length equal to that of a pipe to be laid, the propulsion shafts as well as the pipes being jointed one after another, and the shafts being pushed by a jack in the vertical pit, the excavation means is propelled in the ground. In this method, a leading head pipe in a series of pipes is connected with the excavation means. By doing this, the group of pipes are inserted in the ground being drawn by the excavation means.

In this new method, the repulsion force receiving from the ground is transmitted to the propulsion shafts, but not to the pipes. Thus, the shafts are made of a firm material such as steel and the like, the pipes can be made of a material of low bearing force like vinyl chlolide.

However, there has been found a serious problem in the new method. A pipe to be laid receives friction power resulting from the surrounding ground and then, as the pipes are jointed one after another, the friction power being received by the jointed pipes is in turn transmitted to the pipes in a front side in the series of pipes and, as a result, in the series of pipes led by the excavation means installed at the leading pipe, the leading pipe will receive the greatest tensile stress. Accordingly, there is a problem that the leading pipe is often transformed or destroyed. In some instances, such transformation or destruction takes place at a pipe near the leading pipe in the series of pipes. As the pipe series become longer, this kind of problem is more often encountered.

Therefore, when pipes of low bearing force are laid according to the propulsion pipe-laying method, a total length or number of a series of pipes to be laid at one operaton will be cut so as to avoid huge propulsion power which may work at the head of the leading pipe in the series. However, even though the total length of pipes at one operation is cut, the vertical pit will be needed for every phase of operation in a series of pipes to be laid. Besides, it inevitably causes a necessity of moving and repeated installation of machinery such as a jack and the like which is of great annoyance and increases cost. A plurality of pits dug with a short interval of space on the ground surface will be a serious obstruction for traffic.

OBJECT OF THE INVENTION

An object of this invention is to provide a method and an apparatus which realize continuous pipe-laying over a long distance without causing any distortion or damage for pipes to be laid even though the pipes to be laid are those of low bearing force.

SUMMARY OF THE INVENTION

Pipes to be laid in a method of this invention, being set up on propulsion shafts, are rigidly supported by a supporting device mounted on the propulsion shafts, at the internal surface from the inside, so that, for the pipes to be laid, the propulsion power is supplied through the propulsion shafts.

For the supporting device mounted on the propulsion shafts, it is possible to take any kind of structure, as far as the supporting device can touch the internal surface of the pipes to be laid and rigidly support the pipes. Examples are the pipes being pressed at the internal surface and, thereby, being rigidly supported by frictional supporting power produced thereon, and the pipes being sucked at the internal surface and, thereby, being rigidly supported by vacuum-sucking and others. Examples of the mechanical structure to press the pipes to be laid at the internal surface are a structure equipped, around the propulsion shafts, with expansion members which expand outwardly with a supply of a pressure imparting material, and a structure equipped, around the propulsion shafts, with pad members which fit electrically or mechanically the internal surface of the pipes to be laid, and other structures.

The supporting device may be positioned on the propulsion shafts in any desired place in the axis direction. Each pipe may be supported at one or more parts on the internal surface in the axis direction, where the pipe is fitted by the supporting device. For a series of pipes to be laid, where many pipes are jointed, the whole series of pipes may be supported by the supporting device being rigidly fitted at the internal surface of pipes at one or more arbitrary positions in the series. In other words, a series of pipes may be supported by all pipes individually being supported or a part of the series of pipes being only supported leaving the remaining pipes entirely unsupported.

According to the present invention method, pipes to be laid are rigidly supported from the inside by propulsion shafts and, therefore, even if pipes to be laid are jointed in a long series, the propulsion power can be transmitted to the intermediate pipes in the series of pipes through propulsion shafts arranged therein. As a result, unlike the prior methods, the propulsion power does not occur in a concentrated manner on the head of leading pipe in a series of pipes. Namely, the propulsion power can be transmitted to the intermediate parts in a series of pipes, not to the terminal pipes where stress concentration easily occurs. Stress to be exerted on a pipe can be reduced by dispersing the propulsion power into plural parts of the pipe and also, by decreasing the propulsion power to be exerted per part. The propulsion power can be also divided into plural halfway pipes in a series of pipes to be laid. Due to the reasons stated above, continuous pipe-laying over a long distance becomes possible even if pipes of low bearing force such as polyvinyl chloride pipe and the like are used.

If the supporting device rigidly supports the pipes to be laid with frictional supporting power between the supporting means and the pipes, which is produced by pushing the pipes in contact with the internal surface of pipes, the supporting device can rigidly support the pipes even if the internal surface of the pipes to be laid is smooth and even.

If the supporting device has, on the periphery of propulsion shafts, an expansion member which expands outwardly with a supply of a pressure imparting material, the supporting device can sufficiently contact with the internal surface of pipes to be laid and, consequently, frictional supporting power increases. An expansion member of such a structure can change its shape to overcome an error in the inner diameter of pipes to be laid or uneven in the internal surface of pipes.

The supporting device is installed at plural parts around the periphery in an axial direction of the propulsion shafts and is able to rigidly support the pipes to be laid by fitting the internal surface thereof at plural parts, propulsion power to be transmitted to the pipes to be laid is divided into plural parts, so that the power to be exerted on a part of the pipe is reduced.

The apparatus of this invention for the above-described pipe propulsion method is equipped with an excavation device to excavate a tunnel to lay pipes to be laid therein, a series of propulsion shafts to be jointed behind the excavation device, and a device to exert a propulsion power on the propulsion shafts. A supporting device is installed on the propulsion shafts, supporting rigidly the pipes to be laid, from the inside of pipes.

The pipes to be laid are arranged round the periphery of propulsion shafts.

If the supporting device comprises an expansion member set on the periphery of the propulsion shafts, the expansion member comprising an expansion chamber to induce a pressure imparting material therein, the expansion chamber being connected with supply pipes to supply a pressure imparting material, and a part of the wall surface of the expansion chamber being able to elastically expand outwardly, then the supporting device can fit, closely and rigidly, the pipes to be laid at a part of the wall surface of the expansion chamber, and, consequently, supporting power by friction can be increased. Pressure control of a pressure imparting material to be supplied makes it possible to control the supporting power by friction for pipes to be laid. Supply and exhaust of a pressure imparting material leads to easy control of the rigid support and release for pipes to be laid.

If piercing passages for target collimation for measurement and passages for piping and wiring to the excavation device are formed along the axis of propulsion shafts through the above-mentioned expansion chamber, the passages make possible the target collimation working, and piping and wiring to the excavation device.

If the above-mentioned expansion member is constructed over all the axial length on the periphery of a series of propulsion shafts, the expansion member can closely and rigidly contact with the pipes to be laid at the internal surface thereof, and, consequently, a great supporting power by friction can be obtained.

If above-mentioned expansion member is constructed on plural parts in the axis direction on the periphery of a series of propulsion shafts, the propulsion power to be exerted can be divided into plural parts of a series of pipes to be laid, and, consequently, propulsion power exerting on each pipe can be reduced.

BRIEF DESCRIPTION OF THE DRAWINGS

FIG. 4 is a schematic sectional view taken along the line 4—4 in FIG. 2;

DETAILED DESCRIPTION OF THE INVENTION

Figure 1:
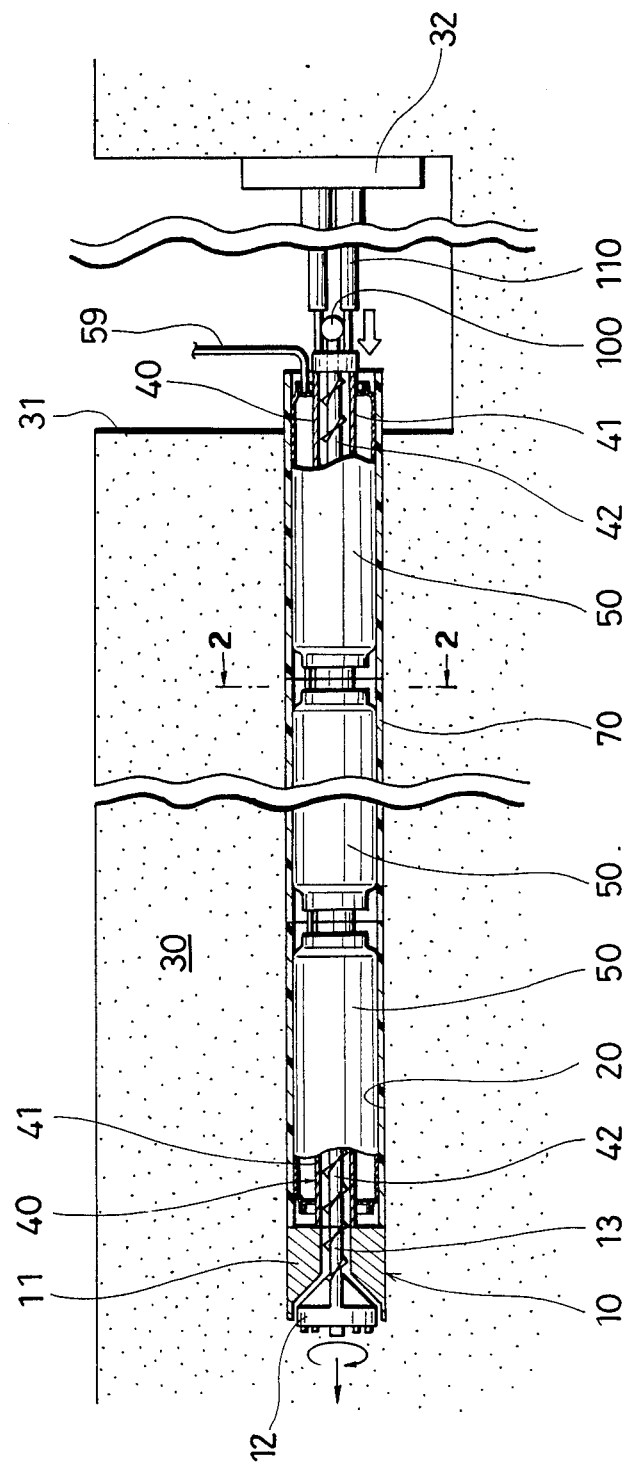
FIG. 1 is a sectional view of the ground wherein the pipe propulsion method of the present invention is being carried out.
Figure 2:
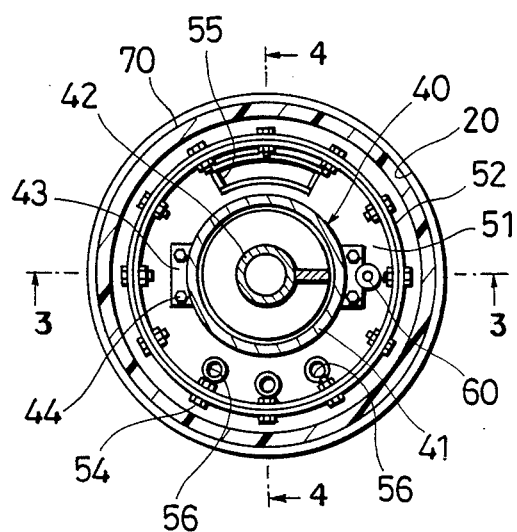
FIG. 2 is a schematic sectional view, on an enlarged scale, taken along the line 2—2 in FIG. 1.

The apparatus for carrying out the method of the present invention will now be described in detail.

In the preferred embodiment shown in FIGS. 1 through 4, an excavation means 10 is provided, at the front end of a cylindrical main body 11, with an auger 12 which rotates and excavates the ground 30. The cylindrical main body 11 has the same as or a bit smaller diameter than that of a tunnel 20 to be excavated. An auger screws 13 are diposed at the trailing end of the auger 12. A propulsion shaft 40 is jointed with the trailing end of the excavation means 10. A propulsion shaft 40 comprises the shaft body 41 being composed of a high stiffness material like steel and the auger screw 42 being installed in the inside of the shaft body 41. The shaft body 41 is fixed at the trailing end of the excavation body 11, and the auger screw 42 in the propulsion shaft 40 is fixed at the trailing end of the auger screw 13 of the excavation means 10 and, as a result, the excavation means 10 and the propulsion shaft 40 are connected. Connecting of the shaft body 41 with the excavation means body 11 and that of the auger screw 42 with the auger screw 13 are carried out by such a disconnectable connecting means as bolts and the like. A propulsion shaft 40 is made in the same length as a pipe 70 to be laid. At both ends of shaft body 41 of a propulsion shaft 40, the two connection flanges 43 and 43 are constructed. Connection of the propulsion shafts 40 are performed with bolts 44 through the matching flanges 43 of the adjacent propulsion shafts 40.

Supporting means to be constructed on the periphery of propulsion shafts 40 will be explained now. On the periphery of each of the propulsion shafts 40, an expansion member 50 is constructed over an almost whole length in the axis direction. The expansion member 50 is covered at both ends by the flange walls 51 of a hollow disc being composed of, for example, steel and on the periphery by the expansion film 52 being composed of, for example, rubber and being capable of elastic expansion. Consequently, the supporting member 50 forms an airtight expansion chamber 53. The flange wall 51 is fixed on the periphery of propulsion shaft 40 by, for example, welding, and the expansion film 52 and the flange wall 51 are connected to each other airtightly by, for example, the bolt-nut 54 or adhesion. The supply pipes 60 to supply a pressure imparting material are connected to the flange wall 51 at both ends. A valve 61 is installed on the halfway part of a supply pipe 60 in the backward way of tunnel 20, that is, in the other side of the excavation means 10. The connection flanges 62 are constructed at both ends of the supply pipes 60, so that the supply pipes 60 can be connected with the other supplier pipe 60 set on the adjacent propulsion shafts 40. On the expansion member 50, there are settled through the expansion chamber 53 between both ends flanges 51, a target collimation passage 55 of a fan shape in a sectional view and a passage 56 of a circular shape in a sectional view to carry out a plurality of wiring and piping. The passages 55 and 56 and the expansion chamber 53 are separated under airtight conditions. The outer diameter of the expansion member 50 constructed as above is designed as a bit smaller than the inner diameter of a pipe 70 to be laid. Therefore, when the pipe 70 to be laid is set about the periphery of a propulsion shaft 40, the expansion film 52 of expansion member 50 does not contact with the internal surface of pipe 70 (as shown by two-dot chain line in FIG. 3).

A method to carry out pipe propulsion with the above-explained apparatus will be now explained.

As shown in FIG. 1, the excavation of a vertical pit 31 from a surface of the ground 30 is followed by excavation of the horizontal tunnel 20 from an inside wall of the pit 31. Though not shown in the drawings, another pit is excavated at an arrival point of the tunnel 20 to be excavated.

The pipes 70 are fixed with the propulsion shaft 40 by expanding the members 50, which is a support of the pipe 70, under the conditions of that a propulsion shaft 40 is connected with the trailing end of excavation means 10 and a pipe 70 to be laid is run over the periphery of the propulsion shaft 40. Fixation of the pipes 70 and the propulsion shaft 40 will be explained in detail. With respect to the two supply pipes 60 at both the ends of an expansion member 50, the supply pipe 60 at the front end closes up the flange 62 with a blind cover, while another 60 at the rear end is connected with a pipe 59 to supply a pressure-imparting material. The pipe 59 is connected, at the other end, to a pressure source (not shown here) arranged on the ground. Air is usually used as a pressure-imparting material, but other gas and liquid, for example, water and oil may be used. When a pressure-imparting material is supplied through the supply pipe 60 to the expansion chamber 53 of the expansion member 50, the expansion film 52 expands outwardly. The expansion film 52 gets in close contact with the pipe 70 at almost all the internal surface, and presses the internal surface of the pipe 70, so that the pipe 70 is rigidly fixed to the expansion member 50 and the propulsion shaft 40. Pressure acting for the pipe 70 to be laid can be adjusted by controlling the pressure of a pressure imparting material to be supplied.

The excavation means 10, the propulsion shaft 40, and the pipe 70, as constructed as above, are horizontally arranged in the pit 31. A driving means 100, for example, a motor is disposed at the trailing end of auger screw 42 of the propulsion shaft 40, and also a jack 110 is arranged at the trailing end of shaft body 41. The jack 110 is set to contact at the leading end thereof with the end surface of the shaft body 41, and at the trailing end with the pressure-supporting wall 32, being made of concrete etc., provided on the inside wall of pit 31. The pressure-supporting wall 32 receives a reaction force which is produced when a propulsion force by the jack 110 is exerted on the propulsion shaft 40. In some cases, electrical wiring or hydraulic oil pipes etc. are connected with an excavation means 10 for a purpose of driving an adjust jack or other devices which is used to correct the excavation direction. In such cases, electrical cables 120 etc. are introduced through the passages 56 formed through the expansion members 50 of the propulsion shaft 40.

The auger screws 42 and the augers 12 connected to a head of the screws are rotated to excavate the inside wall of a vertical pit 31 in a horizontal direction and, at the same time the shaft bodies 41 of the propulsion shaft 40 and the excavation means 10 connected behind the shaft 40 are propelled into the ground 30 by the jack 110. As the excavation means 10 advances, the auger 12 excavates a tunnel 20 further. Excavated soil is sent backward by the auger screws 13 and 42, and discharged into the pit 31 through the trailing end of the shaft bodies 41 of propulsion shaft 40. A device to bring the excavated soil to the ground level may be arranged in the pit 31. The pipe 70 to be laid is rigidly fixed to the propulsion shaft 40 and, consequently, is propelled into the tunnel 20 with propulsion of the excavation means 10 and the propulsion shaft 40.

After a set of propulsion shaft 40 and pipe 70 to be laid is propelled into the tunnel 20 in the ground 30, the valve 61 installed on the supply pipe 60 of the expansion member 50 is closed and then, a joint for the pipe 59 and the supply pipe 60 is released. Pressure imparting material is still filled in the expansion chamber 53 of the expansion member 50, so that the expansion film 52 is still pressing the internal surface of pipe 70 where the pipe 70 is rigidly fixed to the propulsion shaft 40. Then, the drive source 100 and the auger screw 42 are disconnected to release the propulsion force exerted by the jack 110 on the propulsion shaft 40.

A new propulsion shaft 40 is connected at the trailing end of the propulsion shaft 40 and a new pipe 70 to be laid is run over the periphery of the propulsion shaft 40. A supply pipe 60 of the expansion member 50 of the new propulsion shaft 40 is connected with a supply pipe 60 of the expansion member 50 of the antecedently laid propulsion shaft 40 and then, a valve 61 of the forward expansion member 50 is opened, and a pipe 59 is connected to the supply pipe 60 in the back side of expansion member 50 of the new propulsion shaft 40. A collar 71 being composed of the same material as the pipes to be laid 70 is inserted at a joint connecting the newly laying pipe 70 with the forward pipe 70 and both of the pipes 70 are connected to each other by means of adhesion or heat-welding. When a pressure-imparting material is sent through the pipe 59 to the expansion chamber 53 of the expansion member 50 of the new propulsion shaft 40, the expansion film 52 is pressed to the internal surface of pipes to be laid 70 and, as a result, the pipes to be laid 70 are rigidly supported and fixed on the propulsion shaft 40. Since the expansion chamber 53 of the antecendently laid propulsion shaft 40 is connected through the supply pipe 60 and, therefore, if the pressure leaks from the forward expansion chamber 53 when the expansion chamber 53 of the propulsion shaft 40 in front and rear being connected with the supply pipe 60, an immediate supply of the pressure imparting material will maintain the definite pressure.

As explained above, the excavation by operation of the auger 12 as well as propulsion of the excavation means 10, the propulsion shaft 40, and pipes 70 are conducted by a jack 110, and thus a tunnel 20 to lay pipes therein is excavated, together with propelling of the pipes 70 therein. Repeating this process, the tunnel 20 is extended and the pipes 70 are laid. Herein, each pipe 70 is rigidly fixed to the corresponding propulsion shaft 40 and, therefore, the frictional resistance produced between the pipes 70 and the ground 30 is transmitted through the pipes 70 to the corresponding propulsion shaft 40. Therefore, the supporting power for the pipes 70 by an expansion member 50 of the propulsion shaft 40 is sufficient if it is in an order to respond to frictional resistance produced between a pipe 70 and the ground 30. In other words, the supporting power by friction between the pipes 70 and the expansion member 50 of the propulsion shafts 40 needs to be bigger than the frictional resistance produced between the pipes 70 and the ground 30.

In a conventional propulsion pipe-laying method, during a excavation process of the tunnel 20, a laser is sometimes beamed from the pit 31 to a target (not shown) disposed on the back of the excavation means 10 and the beam reflected is received at the pit 31, and thus the straight tunneling of tunnel 20 is checked by determing an accurate position of the excavation means 10. For this purpose, a laser 130 may be beamed through the target collimation passage 55, as shown in FIG. 4.

At a stage that the excavation means 10 has arrived at the vertical pit (not shown) at the arrival end which means that a tunnel 20 is excavated until a scheduled length and the pipes 70 are laid in the tunnel, the pipe 59 is disconnected from the supply pipe 60 of the expansion member 50 of the very trailing end propulsion shaft 40, and the valve 61 is opened. Thus, the whole pressure-imparting mateial working through all the connected expansion chambers 53 are evacuated. When the pressure-imparting material in the expansion chambers 53 is completely evacuated, pressure for the internal wall of pipes 70 exerted by the expansion film 52 is released.

The excavation means 10 and a series of propulsion shafts connected behind are disassembled and removed one after another in the arrival vertical pit. Since the laid-in pipes 70 are not fixed to the propulsion shafts 40 during this process, only the propulsion shafts 40 are taken out through the laid-in pipes 70 leaving a series of pipes 70 being laid in the tunnel 20, and the pipe laying process for the pipes 70 is completed.

In the method and apparatus for propulsion of pipes to be laid in the above-explained embodiments, the expansion film 52 is in close contact with the internal surface of pipes 70 over almost all the internal surface and the contacting area of the expansion film 52 with the pipes 70 is large, so that the expansion film 52 produces large supporting power by friction when it being pressed for the pipes 70 and can support the pipes 70. The expansion film 52 changes its shape elastically, so that it never gives damage or a flaw to the pipes 70. Besides, frictional resistance of the ground 30 exerted on the pipes 70 is divided into all the area of pipes 70 contacting with the expansion films 52 and, therefore, stress to be applied on the pipes 70 is preferably reduced.

In the above embodiment, as a material for the expansion film 52, conventional natural rubber or synthetic rubber may be used. Frictional resistance between the pipes 70 and the ground 30 changes with such conditions as a length, an outer diameter, and a surface material of the pipes to be laid, or characteristic of the ground 30 etc. In accordance with a change of frictional resistance, the supporting power by friction necessary for the expansion film 52 varies. Therefore, characteristic of the expansion film 52, for example, thickness and hardness may be changed in response to the change of necessary supporting power by friction or pressure of the pressure-imparting material. If there is formed fine unevenness or grooves on the outer surface of the expansion film 52, the supporting power by friction for the pipes to be laid 70 increases favorably.

Figure 5:
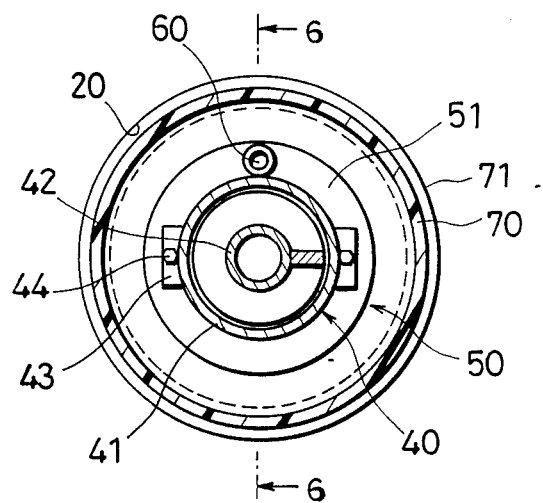
FIG. 5 is a schematic sectional view of a further embodiment of the present invention, wherein the corresponding part of FIG. 2 is shown.
Figure 3:
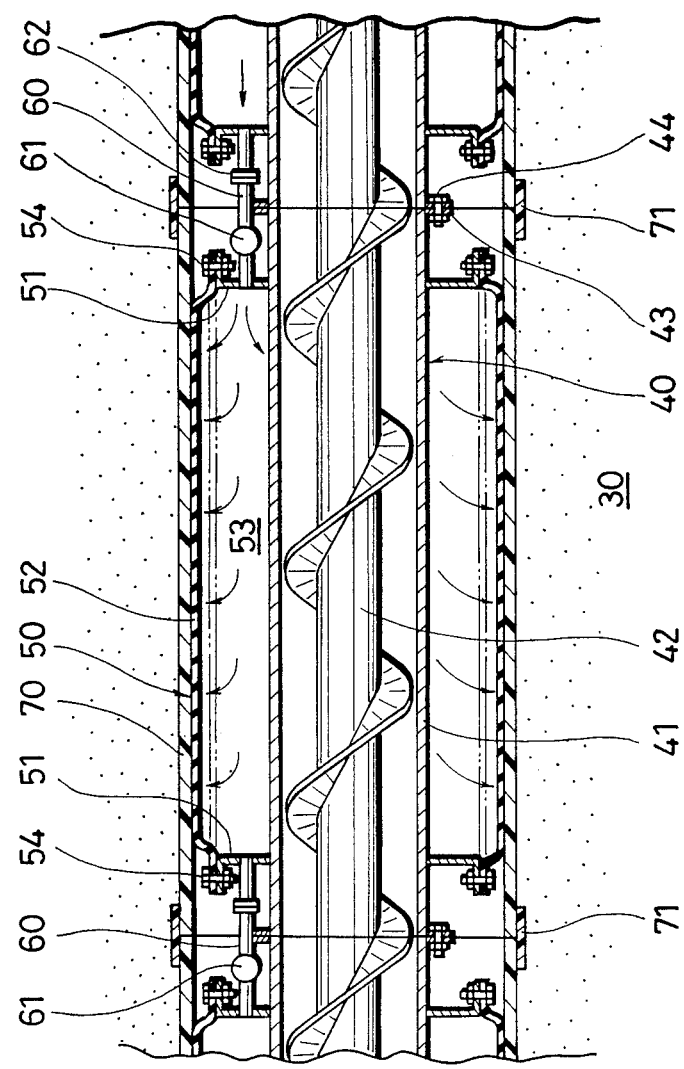
FIG. 3 is a schematic sectional view taken along the line 3—3 in FIG. 2.
Figure 6:
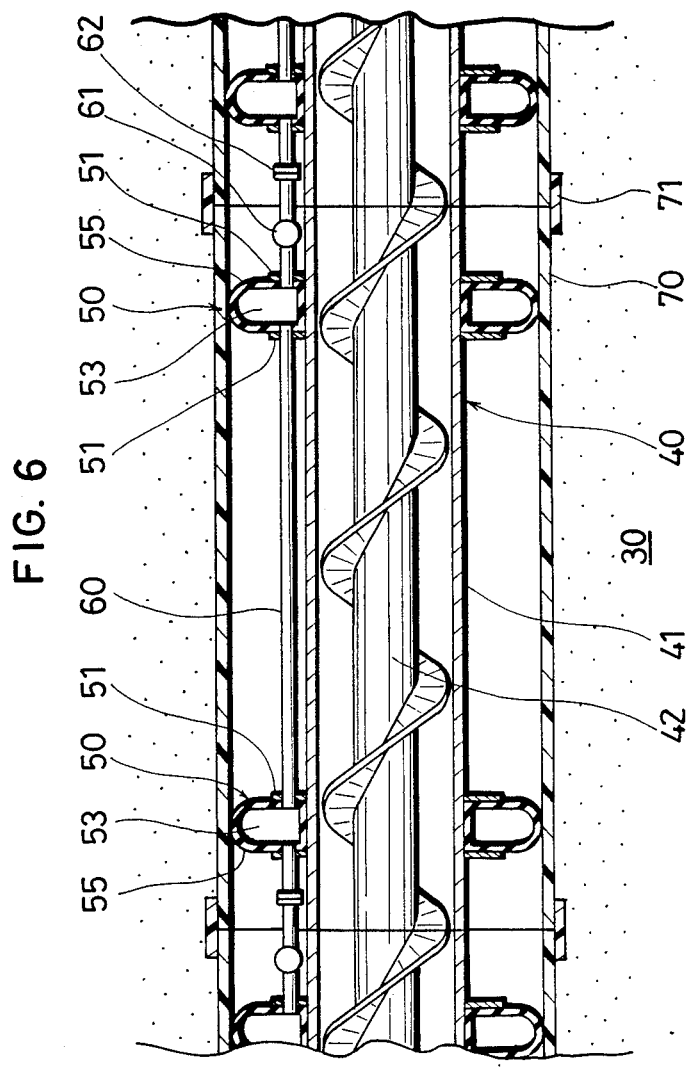
FIG. 6 is a schematic sectional view taken along the line 6—6 in FIG. 5.

FIGS. 5 and 6 show another embodiment using another propulsion means which is different from the above embodiment in the structure of the expansion member 50.

In this embodiment, an expansion member 50 is installed near both ends in an axis direction of a propulsion shaft 40. Each expansion member 50 has an expansion ring 55 of a hollow ring shape made of the same material as the above-explained expansion film 52 between the two flange walls 51 and 51 in a short space. The inside of expansion ring 55 is an expansion chamber 53. The expansion ring 55 is in close contact with the flange walls 51 and the periphery of the propulsion shaft 40 at both of the side surfaces and the inside base and the periphery surface of the expansion ring 55 projects roundly. To the inside of the expansion ring 55 through the flange walls 51 and 51, a supply pipe 60 is connected to supply the same pressure-imparting material as that in a case of the above-explained embodiment. The expansion members 50 in both sides are connected with a supply pipe 60. When the pressure-imparting material is supplied for the expansion rings 55, the expansion rings 55 expand toward the periphery and the outer annular tip of expansion rings 55 presses the internal wall of pipes 70 in contact. In this embodiment, the volume of expansion chamber 53 is small, so that a small supply amount of the pressure-imparting material is enough. The number of expansion members 50 provided for the propulsion shaft 40 is not limited to two as shown in the drawings and may be one, three, or more. As the number of expansion members 50 increases, propulsion power for each of the expansion members 50 is reduced and, consequently, stress to be produced at the pipes 70 is reduced, too.

As a supporting means for the pipes to be laid, in addition to the above-explained embodiment, pads made by a rubber plate etc. may be employed. The pads are installed on the tip of the piston of the hydraulic or pneumatic cylinder installed on the periphery of the propulsion shaft 40, and the pads will work in contact with the internal surface of pipes 70 to be laid by the stroke of the cylinder. Other means for moving the pads are, for example, conventional mechanical device like a link device, a cam device, and the like. In addition to these, a vacuum sticking pad capable of free movement, on the periphery of the propulsion shaft 40 toward the periphery side, may be used. By making the vacuum sticking pads contact with the internal surface of pipes 70 to be laid, the pipe 70 to be laid can be rigidly supported by vacuum adsorption power. In this case, vacuum pipes are connected to vacuum sticking pads, and further connected to a vacuum source arranged in a starting pit 31 or on the ground.

In the embodiments shown in the drawings, although all the pipes 70 in a series of pipes 70 to be laid, prepared by additional connection of plural pipes 70, is rigidly supported by the supporting means which are disposed in the propulsion shaft 40, that is, by the expansion members 50, only a part of pipes 70 in a series may be rigidly supported by the propulsion shaft 40. Even if some of pipes 70 to be laid are not rigidly supported by the propulsion shafts 40, the propulsion power exerting on the supporting part of each pipe to be laid can be reduced in comparison with the conventional methods wherein all the propulsion power is exerted on the leading end or trailing end in a series of pipes to be laid.

With respect to propulsion methods and apparatus other than for the pipe-propulsion method, conventional methods and apparatus may be used and are not limited to the above-explained embodiments. For example, in a conventional propulsion pipe-laying method, pressure water or other excavation aid liquids are often supplied at the head of the auger to make excavation easy and also, to take out the excavated soil through a series of shaft bodies together with such liquids to a vertical pit. These techniques may be employed together with the pipe-propulsion method in the present invention.

I claim:

1. A pipe propulsion method of laying pipes underground comprising the steps of:
    joining at least one propulsion shaft body having pipe supporting means on an external surface thereof to an excavation means to provide a propulsion shaft for excavating a tunnel for laying pipes underground;
    providing a pipe concentric with an external surface of said propulsion shaft body;
    firmly supporting an internal surface of said pipe with said pipe supporting means so as to rigidly fix said pipe to said propulsion shaft;
    axially moving said propulsion shaft by propulsion power to excavate said tunnel and insert said pipe in said tunnel;
    extending said propulsion shaft by joining at least one additional propulsion shaft body having pipe supporting means on an external surface thereof to said propulsion shaft,
    providing at least one additional pipe concentric with said additional propulsion shaft body,
    firmly supporting at least a portion of an internal surface of said additional pipe by said pipe supporting means on said additional propulsion shaft body, and
    axially moving said propulsion shaft by propulsion power to further excavate said tunnel and insert said additional pipe in said tunnel.

2. A pipe propulsion method as claimed in claim 1, and further including the step of: firmly supporting said pipes by said pipe support means from the inside by pressing the internal surface of the pipes.

3. A pipe propulsion method as claimed in claim 1, wherein said pipe supporting means include expansion members which expand outwardly from the propulsion shaft by a supply of a pressure imparting material, and further including the step of outwardly expanding said expansion members so that an outer peripheral surface of the expansion members presses the internal surface of the pipes.

4. A pipe propulsion method as claimed in claim 1, wherein said pipe supporting means is provided at spaced axial positions on the periphery of said propulsion shaft bodies and further including the step of firmly supporting the internal surface of said pipes at spaced positions in the axial direction of said propulsion shaft.

5. A propulsion apparatus for laying pipes comprising:
    an excavation means to excavate a tunnel to lay pipes therein;
    a plurality of propulsion shaft bodies joined one after another behind the excavation means to form a propulsion shaft;
    means for providing propulsion power to the propulsion shaft; and
    supporting means carried by said propulsion shaft bodies to rigidly fix the internal surface of the pipes to an outer periphery of the propulsion shaft for pushing the pipe in said tunnel.

6. A propulsion apparatus for laying pipes as claimed in claim 5, wherein said supporting means comprise expansion members mounted on an outer periphery of said propulsion shaft bodies, the expansion members comprise expansion chambers capable of receiving a pressure imparting material and having a wall that can elastically expand outward in response to receiving said pressure imparting material, and further including supply pipes for supplying said pressure imparting material to said expansion chambers.

7. A propulsion apparatus for laying pipes as claimed in claim 5, wherein said supporting means are expansion chambers and a target collimating passage is formed through said expansion chambers along the axial direction of said propulsion shaft for measurement.

8. A propulsion apparatus for laying pipes as claimed in claim 5, wherein airtight passages for leading piping and wiring toward the excavation means are formed through said expansion chambers in an axial direction of said propulsion shaft.

9. A pipe propulsion apparatus for laying pipes as claimed in claim 5, wherein said supporting means carried by said propulsion shaft bodies is an expansion member constructed on the periphery of each propulsion body and extends over substantially the entire axial length of the propulsion shaft body.

10. A propulsion apparatus for laying pipes as claimed in claim 5, wherein said supporting means carried by said propulsion shaft bodies is comprised of a plurality of axial spaced expansion members on the periphery of each propulsion shaft body.

* * * * *